3,511,880
HYDROCARBONYLATION PROCESS
Frank B. Booth, Placentia, Calif., assignor to Union Oil Company of California, Los Angeles, Calif., a corporation of California
No Drawing. Filed Sept. 16, 1966, Ser. No. 579,825
Int. Cl. C07c 45/00
U.S. Cl. 260—604          9 Claims

ABSTRACT OF THE DISCLOSURE

Hydroformylation of olefins is achieved in partially aqueous high boiling inert organic reaction media which contain a Group VIII noble metal-biphyllic ligand complex as the catalyst and which contain an alkaline material such as ammonium or alkali metal hydroxide. The latter materials activate the catalyst sufficiently for achieving hydroformylation which is performed at a typical condition of approximately 600 p.s.i.g. and about 200° F. as applied to the hydroformylation of propylene to produce normal and iso butyraldehyde.

DESCRIPTION OF THE INVENTION

This invention relates to the preparation of carbonyl compounds from olefins and in particular relates to a method for the hydrocarbonylation of olefins to aldehydes having one or more carbon atom per molecule than the olefin. This invention comprises contacting the olefin, carbon monoxide and hydrogen with a non-reactive, liquid phase reaction medium containing a Group VIII noble metal catalyst in the presence of a biphyllic ligand and an alkaline material.

Recently, processes have been developed for the carbonylation of olefins with liquid phase homogeneous catalysts comprising a Group VIII noble metal and a biphyllic ligand such as an organic phosphine, stibine or arsine. These catalysts provide a hydrocarbonylation reaction that can be conducted under relatively mild conditions; see Chemical Communications, No. 2, p. 17, Jan. 27, 1965. Investigations on reactions with these catalysts such as the rhodium chloride-triphenyl phosphine catalyst mentioned in the preceding article have revealed that the activity of the catalyst is significantly dependent upon the solvent employed for the reaction. In particular, the catalyst requires the use of primary or secondary alcohols, preferably of low molecular weight, to insure reactivity. These alcohols, however, are not the most desirable solvent since they react with the aldehyde products of the carbonylation and form acetals. While the extent of this undesired side reaction can be inhibited to some extent by the addition of an alkaline material such as described in British Pat. 1,002,429, the disadvantages of operating in an alcoholic solvent are not entirely eliminated. To illustrate, it is necessary to employ relatively low molecular weight alcohols as the solvent to achieve attractive rates of reaction. The low molecular weight alcohols are undesired as reaction solvents, not only because they are reactive with the desired aldehyde product of the oxidation but also because the desired product will have a boiling point higher than that of the reaction solvent. This is undesirable because the product recovery cannot be effected by distillation without also distilling the reaction solvent. Accordingly, it is desirable to perform a hydrocarbonylation reaction in solvents other than the low molecular weight primary and secondary alcohols.

It is an object of this invention to provide a method for the hydrocarbonylation of olefins.

It is also an object of this invention to provide for the hydrocarbonylation of olefins in non-reactive solvents.

It is a further object of this invention to provide a process for the hydrocarbonylation of olefins in non-reactive solvents having boiling points higher than that of the carbonyl products.

Other and related objects will be apparent from the following description of the invention.

I have now found that hydrocarbon olefins can be hydrocarbonylated to carbonyl compounds containing one more carbon atom than the olefin reactant by contacting the olefin, carbon monoxide and hydrogen with a liquid phase reaction medium containing a Group VIII noble metal, a biphyllic ligand hereinafter described, and an alkali metal or ammonium hydroxide. When the alkali material is incorporated in the reaction medium which, preferably is partially aqueous, high rates of reaction can be achieved without the necessity to use primary or secondary alcohols as the reaction solvent. Instead, the reaction can be performed in the presence of high-boiling organic solvents which are inert to the reagents and products under the reaction conditions.

With the aforementioned reaction medium, the carbonylation of the ethylenically unsaturated compound proceeds rapidly at relatively mild conditions including temperatures from about 50° to about 200° C.; pressures from 1 to about 300 atmospheres; and ratios of hydrogen to carbon monoxide from 10:1 to about 1:10. The use of the strongly alkaline material permits the use of partially aqueous reaction solvents free of secondary or primary alcohols and permits the use of non-reactive solvents such as tertiary alcohols and high-boiling lactones. The mild conditions of the hydrocarbonylation permits the production of aldehydes with the substantial exclusion of hydrogenation that would yield products such as alcohols or alkanes. This of course is a highly desired result because the aldehyde in many instances is the desired product.

The compound carbonylated in accordance with my invention can comprise any ethylenically unsaturated olefin having from about 2 to about 25 carbons; preferably from 2 to about 18 carbons. This olefin has the following structure:

$$R_2R_1C=CR_4R_3$$

wherein $R_1$, $R_2$, $R_3$ and $R_4$ are hydrogen, alkyl, cycloalkyl, aryl, alkaryl, or aralkyl.

Examples of useful olefins are the hydrocarbon olefins such as ethylene, propylene, butene-1, butene-2, pentene-2, 2-methylbutene-1, hexene-1, 3-ethylhexene-1, octene-3, 2-propylhexene-1, decene-2, 4,4-dimethyl nonene-1, dodecene-1, 6-propyldecene-1, tetradecene-5, 7-amyldecene-3, hexadecene-1, 4-ethyltridecene-2, octadecene-2, octadecene-1, 5,5-dipropyldodecene-3, eicosene-7, etc. Of these the aliphatic hydrocarbon olefins having from about 2 to 18 carbons are preferred and most preferred are the alpha olefins having terminally unsaturated carbons. Choice of the particular olefin depends of course on the desired product. Intermediates for detergents can be prepared by reaction of alpha olefins having from 12 to about 18 carbons. Intermediates useful to prepare polymer plasticizers can be obtained by use of olefins having from about 5 to 13 carbons.

Other olefins which can be carbonylated include vinyl cyclohexane, allylcyclohexane, styrene, p-methylstyrene, alphamethylstyrene, beta-methylstyrene, p-vinylcumene, beta - vinylnaphthalene, 1,2 - diphenylethylene, allylbenzene, 6-phenylhexene-1, 1,3-diphenylbutene-1, 3-benzylheptene-3, o-vinyl-p-xylene, m-aminostyrene, divinylbenzene, 1-allyl-4-vinylbenzene, etc.

The reaction is performed in the presence of a liquid reaction medium. The reaction medium can be an anhydrous inert organic solvent; preferably partially aqueous containing from about 5 to about 50 percent water. Reaction media containing from about 5 to about 25 percent water are most preferred. Any suitable organic liquid can be employed as a reaction solvent which is inert to the reaction conditions, reactants, catalyst and products. Examples of suitable solvents which can be used in accordance with my invention include hydrocarbons such as the aromatics, aliphatics or alicyclic hydrocarbons, ethers, esters, ketones, etc.

Examples of suitable hydrocarbons that can be employed in the solvents include aromatic hydrocarbons such as benzene, toluene, xylene, ethylbenzene, Tetralin, etc.; aliphatic hydrocarbons such as butane, pentane, isopentane, hexane, isohexane, heptane, octane, isooctane, naphtha, gasoline, kerosene, mineral oil, etc.; alicyclic hydrocarbons, e.g., cyclopentane, cyclohexane, methylcyclopentane, Decalin, indane, etc.

Various alkyl and aryl ketones can also be employed as the reaction solvent, e.g., acetone, methylethyl ketone, diethyl ketone, diisopropyl ketone, ethyl-n-butyl ketone, methyl-n-amyl ketone, cyclohexanone, di-iso-butyl ketone, etc.

Ethers can also be employed as the reaction solvent, e.g., diisopropyl ether, di-n-butyl ether, ethylene glycol diisobutyl ether, methyl o-tolyl ether, ethylene glycol dibutyl ether, diisoamyl ether, methyl p-tolyl ether, methyl m-tolyl ether, dichloroethyl ether, ethylene glycol diisoamyl ether, diethylene glycol diethyl ether, ethylbenzyl ether, diethylene glycol diethyl ether, diethylene glycol dimethyl ether, ethylene glycol dibutyl ether, ethylene glycol diphenyl ether, triethylene glycol diethyl ether, diethylene glycol di-n-hexyl ether, tetraethylene glycol diemthyl ether, tetraethylene glycol dibutyl ether, etc.

Various esters can also be employed as the solvent, e.g., ethyl formate, methyl acetate, ethyl acetate, n-propyl formate, isopropyl acetate, ethyl propionate, n-propyl, acetate, sec-butyl acetate, isobutyl acetate, ethyl n-butyrate, n-butyl acetate, isoamyl acetate, n-amyl acetate, ethyl formate, ethylene glycol diacetate, glycol diformate, cyclohexyl acetate, furfuryl acetate, isoamyl n-butyrate, diethyl oxalate, isoamyl isovalerate, methyl benzoate, diethyl malonate, valerolactone, ethyl benzoate, methyl salicylate, n-propyl benzoate, n-dibutyl oxalate, n-butyl benzoate, diisoamyl phthalate, dimethyl phthalate, diethyl phthalate, benzyl benzoate, n-dibutyl phthalate, etc. A preferred class of ester solvents includes the lactones, e.g., butyralactone, valerolactone and their derivatives having lower ($C_4$–$C_5$) alkyl substituents.

Alcohols can also be employed as a reaction solvent. Preferably tertiary alcohols are employed since these materials are substantially non-reactive under the reaction conditions. Primary and secondary alcohols can be employed but are less preferred since these materials can react with aldehyde compounds under the reaction conditions to produce acetals. While in some instances these may be desired products, it is generally desirable to produce the carbonyl compound or alcohol directly without the formation of the acetal. It is of course apparent, if desired, that the acetal can be hydrolyzed to obtain the aldehyde. Examples of alcohols that can be employed as solvents include the aliphatic and alicyclic alcohols such as methanol, ethanol, isopropanol, butanol, t-butanol, t-amyl alcohol, hexanol, cyclohexanol, etc.

The catalyst contains a Group VIII noble metal. The Group VIII noble metal can be of the palladium subgroup or the platinum subgroup, i.e., palladium, rhodium, or ruthenium or platinum, osmium or iridium. While catalysts containing any of these metals are active for the reaction, I prefer to employ rhodium catalysts because of their demonstrated greater activity, particularly at the relatively mild reaction conditions employed for the reaction. A catalytic quantity of the Group VIII noble metal containing catalyst is used. This is generally an amount sufficient to provide a concentration of the Group VIII noble metal which is between about 0.002 and about 2.0 weight percent of the liquid reaction medium and preferably between about 0.05 and about 0.5 weight percent. The Group VIII noble metal can be added to the reaction medium as a soluble salt, a carbonyl compound or chelate. Examples of suitable salts are the nitrates and halides of the metals such as palladium chloride, palladium nitrate, rhodium acetate, ruthenium bromide, osmium fluoride, palladium chloride, etc. Examples of the suitable chelates are palladium acetyl acetonate and complexes of the platinum group metal ions with such conventional chelating agents as ethylenediamine tetraacetic acid and its alkali metal salts, citric acid, etc. The carbonyl of the Group VIII noble metal can be prepared externally and introduced into the reaction medium. The carbonyl compound can also be produced in situ by the addition of the aforementioned soluble salt or chelates of the Group VIII noble metal, the biphyllic ligand and carbon monoxide to the reaction medium.

The catalyst employed in the process of this invention also comprises a biphyllic ligand, i.e., a compound having an element with a pair of electrons capable of forming a coordinate bond with a metal atom and simultaneously having the ability to accept the electron from the metal, thereby imparting additional stability to the resulting complex catalyst. Biphyllic ligands can comprise organic compounds having at least about 3 carbons and containing arsenic, antimony or phosphorus in a trivalent state. Of these, the phosphorus compounds, i.e., the phosphines, are preferred; however, the arsines and stibines can also be employed. In general these biphyllic ligands have the following structure:

or the following structure:

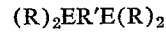

wherein E is a trivalent atom selected from the class consisting of phosphorus, arsenic and antimony; and
wherein R is a member of the class consisting of hydrogen, alkyl from 1 to 8 carbon atoms, aryl from 6 to 8 carbons and halo and alkoxy substitution products thereof; and
wherein R' is alkylene having from 1 to about 8 carbons.

Examples of suitable biphyllic ligands having the aforementioned structure and useful in my invention to stabilize the catalyst composition are the following: trimethyl phosphine, triethyl arsine, triisopropyl stibine, diethyl chlorophosphine, triaminobutyl arsine, ethyldiisopropyl stibine, tricyclohexyl phosphine, triphenyl phosphine, tri(o-tolyl)phosphine, phenyldiisopropyl phosphine, phenyl diamyl phosphine, diphenylethyl phosphine, chlorodixylyl phosphine, chlorodiphenyl phosphine, tris-(diethylaminomethyl)phosphine, ethylene bis(diphenyl phosphine), hexamethylene bis(diisopropyl arsine), pentamethylene bis(diethylstibine), etc. Of the aforementioned, the aryl phosphines are preferred because of their demonstrated gerater activity for stabilization of catalysts.

As previously mentioned, the process of this invention is characterized by the presence of an alkali material in the partially aqueous reaction solvent. Suitable alkaline material for use in this invention comprise the alkali metal and ammonium hydroxides, e.g., sodium hydroxide, lithium hydroxide, potassium hydroxide, cesium hydroxide or ammonium hydroxide. The reaction medium can contain from about 0.01 to about 10 weight percent; preferably from about 0.1 to about 3 weight percent of the alkali metal or ammonium hydroxide. I have found that in the presence of the alkali material partially aqueous reaction solvents can be employed and the dependency on the presence of primary and secondary alcohols is eliminated.

The reaction is performed under relatively mild conditions including temperatures from about 50° to about 200° C.; preferably from about 70° to about 150° C. Sufficient pressure is used to maintain the reaction medium in liquid phase. Although atmospheric pressure can be used, the rate of reaction is increased by superatmospheric pressures and, therefore, pressures from about 5 to about 300 atmospheres and preferably from about 10 to about 100 atmospheres are used. The ratio of the reactants can be widely varied if desired, e.g., the molecular ratio of hydrogen to carbon monoxide can be varied from about 1:10 to about 10:1. The preceding conditions are maintained by conventional means. Since the reaction is exothermic, the temperature can be maintained by suitable cooling of all or a portion of the reaction zone contents. The pressure can be maintained by the pressure of the gases supplied to the reaction zone. If desired, a suitable inert gas can also be charged to the reaction zone to reduce the partial pressures of the reacted gases, i.e., hydrogen and carbon monoxide. Nitrogen is a suitable inert gas. As indicated by the examples below, the reactants are maintained in contact for a time not in excess of 45 minutes.

The relative concentration of the carbon monoxide and hydrogen significantly affects the distribution of the normal and branched chain isomers in the product. The carbon monoxide to hydrogen ratio can be maintained from about 1:10 to about 1:3 and preferably from about 1:10 to about 1:5 to favor production of the straight chain aldehyde. Surprisingly, under these high hydrogen partial pressures no significant hydrogenation occurs and the straight chain product can be obtained in amounts from 3 to 8 times the yield of the branched chain aldehyde.

The process can be conducted continuously or batchwise; however, the continuous processing is preferred. In the latter preferred technique, the catalyst is charged to the reaction zone in a suitable solvent or in excess of the olefin and the gaseous reactants are introduced into contact with the reaction solvent and catalyst in the reaction zone. A continuous withdrawal of the liquid phase in the reaction zone can be employed; this material is then reduced in pressure to remove the dissolved gases which can be recycled, cooled and then distilled to recover the desired products. When low molecular weight products are produced, e.g., propionaldehyde, this product can be recovered by employing a high gas rate through the reactor to strip the product from the reaction solvent which, desirably, is a higher boiling liquid such as tertiary butanol, tertiary amyl alcohol, butyrolactone, etc.

Because the reaction conditions are very mild, the products can remain in the reaction zone without encountering undue degradation to less desired products and therefore batchwise operation can be practiced by introducing the olefin, hydrogen and carbon monoxide into contact with the catalyst solution until a sufficient inventory of product is accumulated in the reaction zone and thereafter the reaction discontinued and the product recovered by suitable steps, typically distillation.

The major product of the reaction is the straight chain aldehyde and the only other product in significant quantities is a lesser amount of the branched chain aldehyde. This result is particularly surprising when the preferred catalyst, i.e., rhodium, is employed since the use of rhodium in previous hydroformylation reactions is known to catalyze the formation of the branched chain products.

The practice of the invention will not be illustrated by the following examples which will also serve to demonstrate the results obtainable thereby:

EXAMPLE 1

Into a half gallon autoclave was introduced 240 grams butyrolactone, 10 grams concentrated ammonium hydroxide (28% $NH_3$), 0.3 gram rhodium trichloride and 2 grams triphenyl phosphine. The autoclave was purged with carbon monoxide and 106 grams of propylene were added. The autoclave was then pressured to 300 p.s.i. with carbon monoxide and finally to 600 p.s.i. with hydrogen. The autoclave was then heated to 190° F. and maintained at that temperature for 45 minutes during which the autoclave pressure decreased 350 p.s.i. Upon completion of the reaction the autoclave was cooled, depressured, opened and the liquid contents distilled to recover 71 grams of a butyraldehyde mixture having a normal to iso ratio of 1.7. When the experiment is attempted in the absence of ammonium hydroxide or an alkali metal hydroxide, no reaction occurs.

EXAMPLE 2

Into the half gallon autoclave was introduced 490 grams t-amyl alcohol, 5 grams water, 5 grams concentrated ammonium hydroxide and 0.3 gram $RhCl(CO)(triphenyl phosphine)_2$. The autoclave was purged with nitrogen and 100 grams propylene were then added. The autoclave was then pressured to 300 p.s.i. with carbon monoxide and to 600 p.s.i. with hydrogen. The autoclave was then heated to 195° F. and maintained at that temperature for 9 minutes during which the pressure decreased 200 p.s.i. Upon completion of the reaction, the liquid products were distilled to recover a mixture of normal and iso butyraldehydes having a ratio of normal to iso of 2.8.

The experiment was repeated with the substitution of 10 milliliters of aqueous one molar sodium hydroxide for the water and ammonium hydroxide used in the preceding experiment. The reaction was performed for 12 minutes during which the pressure decreased 200 p.s.i. and a mixture of butyraldehydes having a normal to iso ratio of 2.6 was obtained.

The reaction was again repeated using 9 grams of water and 1 milliliter of aqueous 0.09 molar sodium hydroxide. The autoclave was charged with 107 grams of propylene and the reaction repeated to observe a 200 p.s.i. drop in pressure in 27 minutes at the reaction temperature. The distillation of the products yielded a mixed butyraldehyde product having a normal to iso ratio of 2.1.

EXAMPLE 3

To illustrate the dependency of the reaction upon the presence of the alkaline material, the autoclave was charged with 250 grams butyrolactone and 0.3 gram rhodium chloride-triphenyl phosphine catalyst. The reactants were purged with carbon monoxide and the autoclave was then charged with 110 grams propylene. The autoclave was pressured to 300 p.s.i. carbon monoxide and 300 p.s.i. hydrogen and heated to 190° F. and maintained at that temperature for about 30 minutes. The pressure of the autoclave did not decrease, indicating that no reaction had taken place and the autoclave was then heated to 295° F. and maintained at that temperature for an additional 30 minutes. When no pressure decrease was observed, the autoclave was heated to 360° F. and no reaction occurred after 30 minutes. Further attempts to initiate reaction were discontinued.

The preceding experiment was repeated using 240 grams butyrolactone and 10 grams water for the reaction medium. The reaction did not initiate, indicating the non-reactivity of this reaction medium.

The preceding exemplified disclosure of the invention is only intended to illustrate the best mode of practicing the invention and it is not intended that this exemplified disclosure shall be unduly limiting of the invention. Instead, it is intended that the invention be defined by the steps and reagents of their obvious equivalents set forth in the following method claims:

I claim:
1. The hydrocarbonylation of an ethylenically unsaturated hydrocarbon olefin having from 2 to about 25 carbons to a carbonyl compound having at least one more carbon than said hydrocarbon olefin to the substantial exclusion of alcohols that comprises contacting said olefin, carbon monoxide, and hydrogen with a reaction medium comprising an organic reaction solvent inert to the reactants and products at the reaction conditions, said solvent containing from about 0.002 to about 2.0 weight percent of rhodium, a bipyllic ligand selected from the class consisting of:

$$E(R)_3 \text{ and } (R)_2ER'E(R)_2$$

wherein E is a trivalent atom selected from the class consisting of phosphorus, arsenic and antimony;

wherein R is aryl from about 6 to about 8 carbons, and halo and alkoxy derivatives thereof;

wherein R' is alkylene having from 1 to about 8 carbons;

and from about 0.01 to about 10.0 weight percent of an alkaline material selected from the class consisting of alkali metal and ammonium hydroxides; maintaining said reaction medium during said contact at a temperature between about 70° and about 150° C. for a contact time not in excess of 45 minutes and maintaining the pressure of said carbon monoxide and hydrogen between about 5 and about 300 atmospheres.

2. The hydrocarbonylation of claim 1 wherein said reaction solvent is partially aqueous and contains from about 5 to about 25 weight percent water.

3. The hydrocarbonylation of claim 1 wherein said biphyllic ligand is a triaryl phosphine.

4. The hydrocarbonylation according to claim 3 wherein said phosphine is triphenyl phosphine.

5. The hydrocarbonylation of claim 1 wherein said hydrocarbon olefin is an alkene having from about 2 to about 12 carbons.

6. The hydrocarbonylation of claim 1 wherein said carbon monoxide and hydrogen are introduced into contact with said reaction medium at a relative molar concentration of from about 2:1 to about 1:2.

7. The hydrocarbonylation of claim 1 wherein said alkaline material is ammonium hydroxide.

8. The hydrocarbonylation of claim 1 wherein said reaction solvent is partially aqueous.

9. The hydrocarbonylation of claim 1 wherein said reaction solvent has a higher boiling point than said carbonyl compound.

References Cited

UNITED STATES PATENTS

| 3,278,612 | 10/1966 | Greene | 260—604 X |
| 3,102,899 | 9/1963 | Cannell | 260—439 |

LEON ZITVER, Primary Examiner

R. H. LILES, Assistant Examiner

U.S. Cl. X.R.

252—428, 429, 430, 431